(12) United States Patent
Athreya et al.

(10) Patent No.: US 11,727,544 B2
(45) Date of Patent: *Aug. 15, 2023

(54) CONSTRUCTING IMAGES OF USERS' FACES BY STITCHING NON-OVERLAPPING IMAGES

(71) Applicant: HEWLETT-PACKARD DEVELOPMENT COMPANY, L.P., Spring, TX (US)

(72) Inventors: Madhu Sudan Athreya, Palo Alto, CA (US); William J. Allen, Corvallis, OR (US); Cheng I Huang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,619

(22) Filed: Jan. 7, 2022

(65) Prior Publication Data
US 2022/0132037 A1 Apr. 28, 2022

Related U.S. Application Data

(63) Continuation of application No. 16/605,895, filed as application No. PCT/US2018/016985 on Feb. 6, 2018, now Pat. No. 11,228,709.

(51) Int. Cl.
*G06T 5/00* (2006.01)
*G06V 40/16* (2022.01)
(Continued)

(52) U.S. Cl.
CPC ............ *G06T 5/005* (2013.01); *G06V 10/225* (2022.01); *G06V 40/166* (2022.01);
(Continued)

(58) Field of Classification Search
None
See application file for complete search history.

(56) References Cited

U.S. PATENT DOCUMENTS 6,064,749 A 5/2000 Hirota et al.
9,355,433 B1 5/2016 Adsmuilli et al.
(Continued)

FOREIGN PATENT DOCUMENTS

CN 101299270 A 11/2008
CN 103152518 A 6/2013
(Continued)

OTHER PUBLICATIONS

Y. Zhao et al., "Mask-off: Synthesizing Face Images in the Presence of Head-mounted Displays," 2019 IEEE Conference on Virtual Reality and 3D User Interfaces (VR), Osaka, Japan, 2019, pp. 267-276. (Year: 2019).*

(Continued)

*Primary Examiner* — James M Anderson, II
(74) *Attorney, Agent, or Firm* — Quarles & Brady LLP (57) ABSTRACT

An apparatus includes a support, a first camera, and second camera, and a processor. The support is configured to be mounted to a head of a user. The first camera is mounted on the support and positioned to capture a first image of a face of the user. The second camera is mounted on the support and positioned to capture a second image of the face of the user that is non-overlapping with the first image. The processor is mounted to the support and programmed to stitch the first image and the second image together to construct an image of the face of the user.

20 Claims, 7 Drawing Sheets

(51) Int. Cl.
*H04N 23/698* (2023.01)
*H04N 23/90* (2023.01)
*G06V 10/22* (2022.01)

(52) U.S. Cl.
CPC ......... *G06V 40/168* (2022.01); *H04N 23/698* (2023.01); *H04N 23/90* (2023.01)

(56) References Cited

U.S. PATENT DOCUMENTS

| | | |
|---|---|---|
| 2005/0083248 A1 | 4/2005 | Biocca et al. |
| 2007/0273795 A1 | 11/2007 | Jaynes et al. |
| 2012/0169882 A1 | 7/2012 | Millar et al. |
| 2013/0141521 A1 | 6/2013 | Williams |
| 2013/0141525 A1 | 6/2013 | Williams |
| 2014/0043329 A1 | 2/2014 | Wang et al. |
| 2016/0088287 A1 | 3/2016 | Sadi et al. |
| 2016/0217621 A1 | 7/2016 | Raghoebardajal et al. |
| 2017/0091535 A1 | 3/2017 | Yu et al. |
| 2017/0287194 A1 | 10/2017 | Katz et al. |
| 2018/0025526 A1 | 1/2018 | Cotter et al. |

FOREIGN PATENT DOCUMENTS

| | | | |
|---|---|---|---|
| CN | 103179339 A | 6/2013 | |
| CN | 103270540 A | 8/2013 | |
| WO | WO-2017122299 | 7/2017 | |
| WO | WO-2017122299 A1 * | 7/2017 | .............. G06F 3/011 |

OTHER PUBLICATIONS

Zhao, "Mask-off: Synthesizing Face Images in the Presence of Head-mounted Displays", Computer Vision and Pattern Recognition (cs.CV), Oct. 26, 2016, arXiv: 1610.084819 [sc.CV].

* cited by examiner

CONSTRUCTING IMAGES OF USERS' FACES BY STITCHING NON-OVERLAPPING IMAGES

CROSS REFERENCE TO RELATED APPLICATIONS

This application is a continuation of U.S. patent application Ser. No. 16/605,895, filed Oct. 17, 2019, which in turn claims priority to International Application No. PCT/US2018/016985, filed Feb. 6, 2018. Both of these applications are incorporated by reference in their entireties.

BACKGROUND

Head mounted displays (HMDs) are wearable devices that may include display optics and/or cameras. For instance, HMDs may be used in virtual reality applications, where cameras mounted on the HMD are used to acquire images of the user's face. The acquired images may then be used to construct a virtual image of the user.

DETAILED DESCRIPTION

The present disclosure broadly describes an apparatus, method, and non-transitory computer-readable medium for constructing images of users' faces using non-overlapping images. As discussed above, head mounted displays (HMDs) are wearable devices that may include display optics and/or cameras. For instance, HMDs may be used in virtual reality applications, where cameras mounted on the HMD are used to acquire images of the user's face. The acquired images may then be used to construct a virtual image of the user. For instance, the virtual image may depict a facial expression that mimics a facial expression of the user in the captured images. A mimicked facial expression may, in turn, be used to adapt content or haptics to the user's current mood, to gauge the user's reaction to specific content, and/or to animate a user avatar for multi-player gaming, among other applications.

In order to accurately mimic a user's facial expression in a virtual image, many VR applications rely on knowledge of facial landmark points. Facial landmark points are features of the user's face (e.g., eyes, nose, mouth, and the like) that have known, unique positions and spatial separations. Pinpointing the locations of these landmark points is not always a straightforward task. For instance, when the images of the user's face are acquired by multiple different cameras, landmark points may be difficult to detect due to depth disparities, differences in field of view (which may be non-overlapping), occlusions, and other geometric distortions that may vary from camera to camera.

Examples of the present disclosure provide a method for aligning and stitching a plurality of non-overlapping images captured by a plurality of cameras of an HMD to construct a single facial image of a user wearing the HMD. At the time of image capture, a set of fiducials (e.g., reference markings) is projected onto the user's face, such that the fiducials are visible in the plurality of images. The plurality of images is then corrected for static distortions (due to, e.g., lens distortions, relative rotational and translational differences between the cameras, and/or relative scale differences due to variations in the fields of view of the cameras) using camera parameters that may be collected offline. The plurality of images is also corrected for dynamic distortions (due to, e.g., differences in user pose with respect to the cameras, variations in user facial contours, and variations in how a user wears the HMD from one session to another) using camera parameters that are collected at or just before the time of image capture. Correction of the static and dynamic distortions also corrects the spatial orientations of the fiducials in the plurality of images, which allows fiducials in one image to be matched to corresponding fiducials in another image, thereby enabling the images to be aligned to each other or stitched together. The plurality of images may be aligned in this manner until a single facial image of the user is constructed. Subsequently, facial landmark points may be located in the single facial image and used to determine the user's facial expression.

Within the context of the present invention, the term "stitching" refers to the operation of aligning two or more non-overlapping images to form a composite image. As the two or more non-overlapping images do not overlap, gaps may be present in the composite image (e.g., representing portions of the imaged scenery that are not present in any of the non-overlapping images). Thus, although the stitching operation may align the non-overlapping images so that they are correctly orientated and positioned relative to each other, the stitching operation may not remove the gaps that are naturally present between the non-overlapping images. However, these gaps may be filled using additional operations subsequent to the stitching.

Moreover, although examples of the present disclosure are described within the context of a head mounted display (i.e., a device that is configured to be worn on a user's head), the examples described herein are equally applicable to display devices that may be positioned proximal to the user's head without actually being mounted or worn on the head. For example, the display device may be configured with a handle that is held in the user's hand and so that the cameras, display, and/or other components are positioned near the user's head (e.g., similar to a set of opera glasses).

Figure 1:
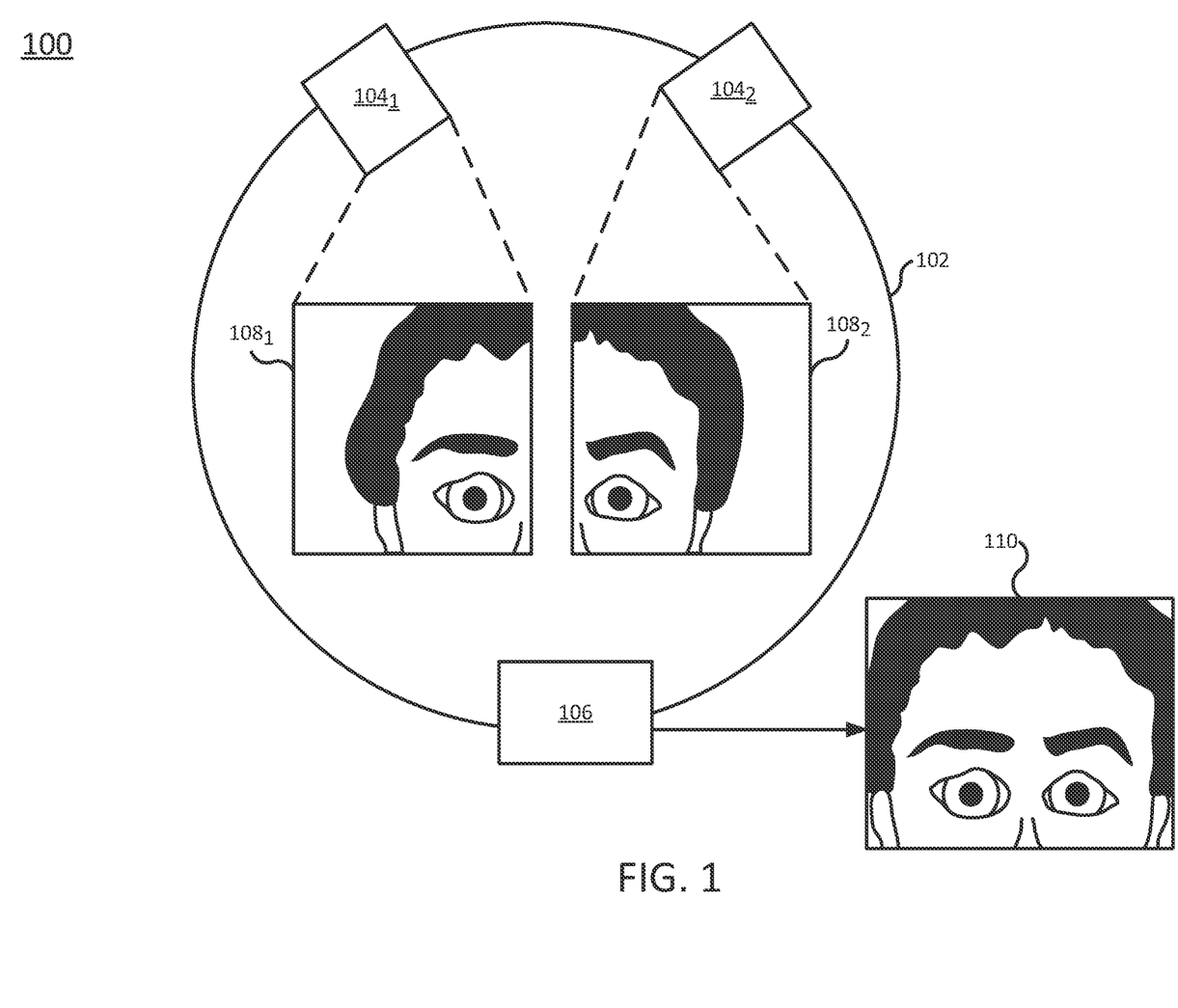
FIG. 1 depicts a high-level block diagram of an example apparatus of the present disclosure.

FIG. 1 depicts a high-level block diagram of an example apparatus 100 of the present disclosure. The apparatus may comprise, for example, a head mounted display. Thus, in one example, the apparatus 100 generally comprises a support 102, a plurality of cameras $104_1$-$104_2$ (hereinafter referred to individually as a "camera 102" or referred to collectively as "cameras 102"), and a processor 106.

The support 102 is configured to be mounted on a human user, near the user's face. For instance, the support 102 may be configured to be worn on the user's head. As such, the support 102 may have a generally circular or elliptical shape, and may be constructed as a headband, a helmet, or a similar piece of headwear. Alternatively, the support 102 may be configured as a pair of glasses or goggles. In further examples still, the support 102 may not be configured to be worn on the user's head, but may be configured to be supported near the user's head in some other way. For instance, the support 102 may comprise a handle that is held in the user's hand so that the cameras 104 are positioned near the user's head.

The plurality of cameras 104 includes at least a first camera (e.g., camera $104_1$) and a second camera (e.g., camera $104_2$) mounted to an inward-facing side (e.g., a side facing the user, when the apparatus 100 is worn by the user) of the support 102. Although two cameras 104 are illustrated in FIG. 1, the apparatus 100 may include more than two cameras. The cameras 104 are positioned to capture images of the user's face when the user is wearing the apparatus 100. For instance, the first camera $104_1$ may capture a first image $108_1$ of the user's face from a first field of view, while the second camera $104_2$ may capture a second image $108_2$ of the user's face from a second field of view. In one example, the images $108_1$ and $108_2$ captured by the plurality of cameras 104 are non-overlapping. For instance, none of the features that are depicted in the first image $108_1$ may be depicted in the second image $108_2$. This makes the task of stitching the images together to construct a single facial image of the user more challenging.

The plurality of cameras 102 may include different types of cameras. For instance, the plurality of cameras 102 may include two-dimensional cameras, three-dimensional cameras, thermal imaging cameras, stereo cameras, and/or other types of cameras. Two or more cameras 102 of the plurality of cameras 102 may have different lens geometries, different optics, and/or different sensor systems.

The processor 106 may also be mounted to the support 106 and may comprise a microcontroller, a microprocessor, a central processing unit (CPU) core, an application-specific integrated circuit (ASIC), a field programmable gate array (FPGA), or the like. In another example, the processor 106 may not be mounted to the support 102, but may be located remotely from the support 102. In this case, the processor 106 may communicate, directly or indirectly, with the plurality of cameras 104 that is mounted to the support (e.g., via a wireless network connection). The processor 106 is programmed (e.g., using a set of instructions stored on a non-transitory computer readable storage medium) to stitch a plurality of images captured by the plurality of cameras 104 together to construct a single (e.g., composite) facial image of the user. For instance, the processor may stitch the first image $108_1$ and the second image $108_2$ together to construct a single facial image 110.

Figure 2:
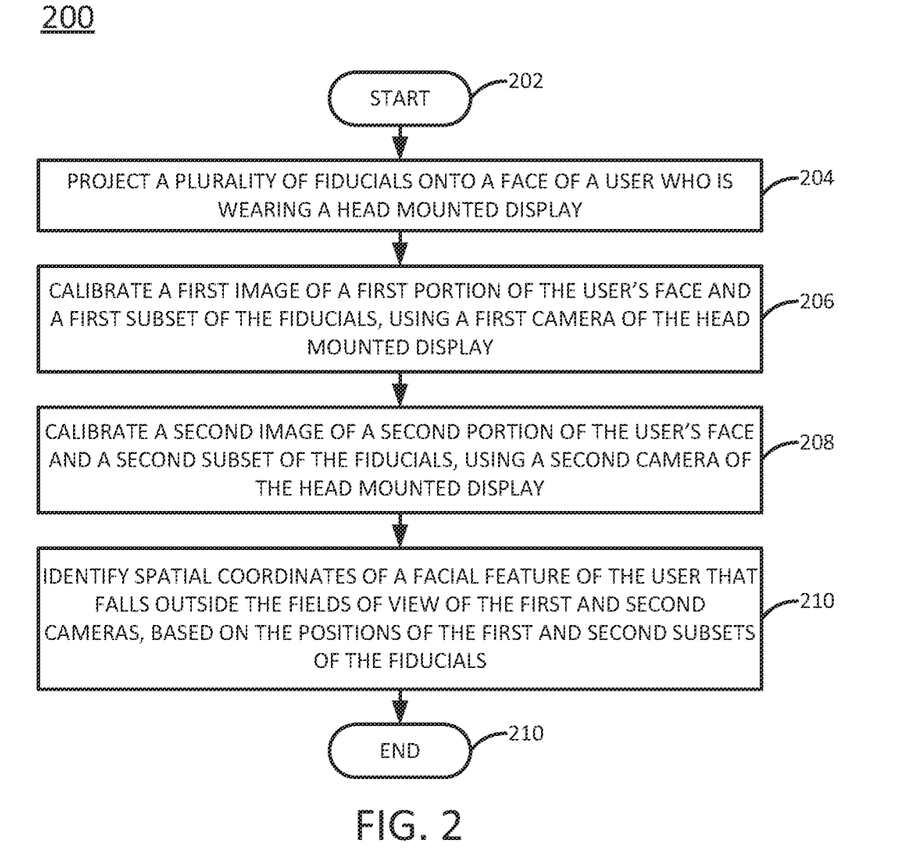
FIG. 2 illustrates a flowchart of an example method for operating a head mounted display.

FIG. 2 illustrates a flowchart of an example method 200 for operating a head mounted display. The method 200 may be performed, for example, by components of the apparatus 100 illustrated in FIG. 1. As such, reference may be made in the discussion of FIG. 2 to various components of the apparatus 100 to facilitate understanding. However, the method 200 is not limited to implementation with the apparatus illustrated in FIG. 1.

The method 200 begins in block 202. In block 204, a plurality of fiducials is projected onto a face of a user who is wearing a head mounted display, using a light source of the head mounted display. The light source may comprise one or more light emitting diodes (LEDs) that emit light in wavelengths that are known to be relatively safe to human vision (e.g., infrared). Each LED may be associated with one of a plurality of cameras mounted to the HMD. Each fiducial may comprise a marking, such as a dot, a dash, an x, or the like that is projected onto the user's face.

Figure 3:
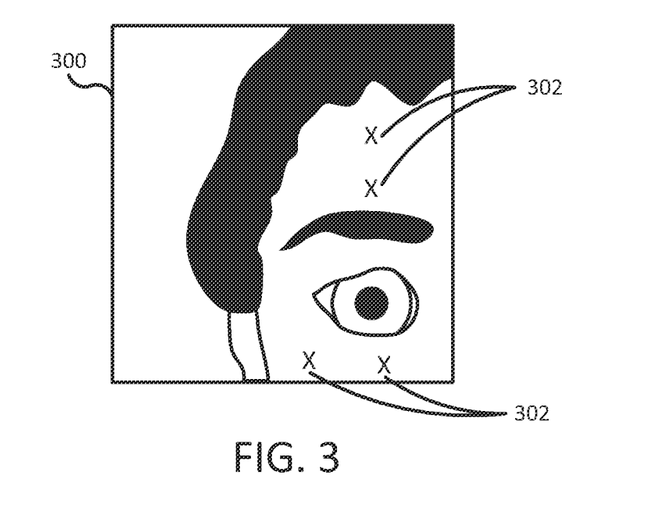
FIG. 3 illustrates an example of an image that may be captured during execution of the method of FIG. 2.

In block 206, a first image depicting a first portion of the user's face and a first subset of the fiducials is captured by a first camera of the head mounted display. FIG. 3, for instance, illustrates an example of an image 300 that may be captured during execution of the method 200 of FIG. 2. For instance, the image 300 of FIG. 3 may be the first image captured in accordance with block 206 of the method 200. As illustrated, the image 300 depicts a portion of a user's face, as well as a plurality of fiducials 302 (depicted in FIG. 3 as a plurality of x's) that have been projected onto the user's face at the time of image capture.

In block 208, a second image depicting a second portion of the user's face and a second subset of the fiducials is captured by a second camera of the head mounted display. In one example, the second image is non-overlapping with the first image. That is, none of the features or fiducials that are depicted in the second image may be depicted in the first image. For instance, if the first image depicted an upper right portion of the user's face, the second image might depict an upper left portion of the user's face, or some other portion of the user's face other than the upper right portion.

In a further example, a gap may exist between the first image and the second image. For instance, the first image may depict an upper right portion of the user's face, and the second image may depict an upper left portion of the user's face, but some portion of the user's face residing between the upper right and upper left portions may not be depicted in either of the first image and the second image. In one example, a spatial separation between the first camera and the second camera is known prior to projection of the fiducials in block 204.

In block 210, spatial coordinates of a feature of the user's face that falls outside a first field of view of the first camera and a second field of view of the first camera is identified, based on the positions of the first subset of the fiducials in the first image and the second subset of the fiducials in the second image. As discussed in connection with block 208, the first image may depict an upper right portion of the user's face, and the second image may depict an upper left portion of the user's face, but some portion of the user's face residing between the upper right and upper left portions may not be depicted in either of the first image and the second image. This portion of the user's face residing between the upper right and upper left portions may be outside the respective fields of view of the first and second cameras. However, as described in greater detail below in connection with FIG. 4, examples of the disclosure may use the fiducials depicted in the first and second images to interpolate between pixels of the first and second images and thereby generate a third image that fills the gap between the first and second images. The third image may infer the spatial coordinates of a feature that was not depicted in the first or second image.

The method 200 ends in block 212.

Figure 4:
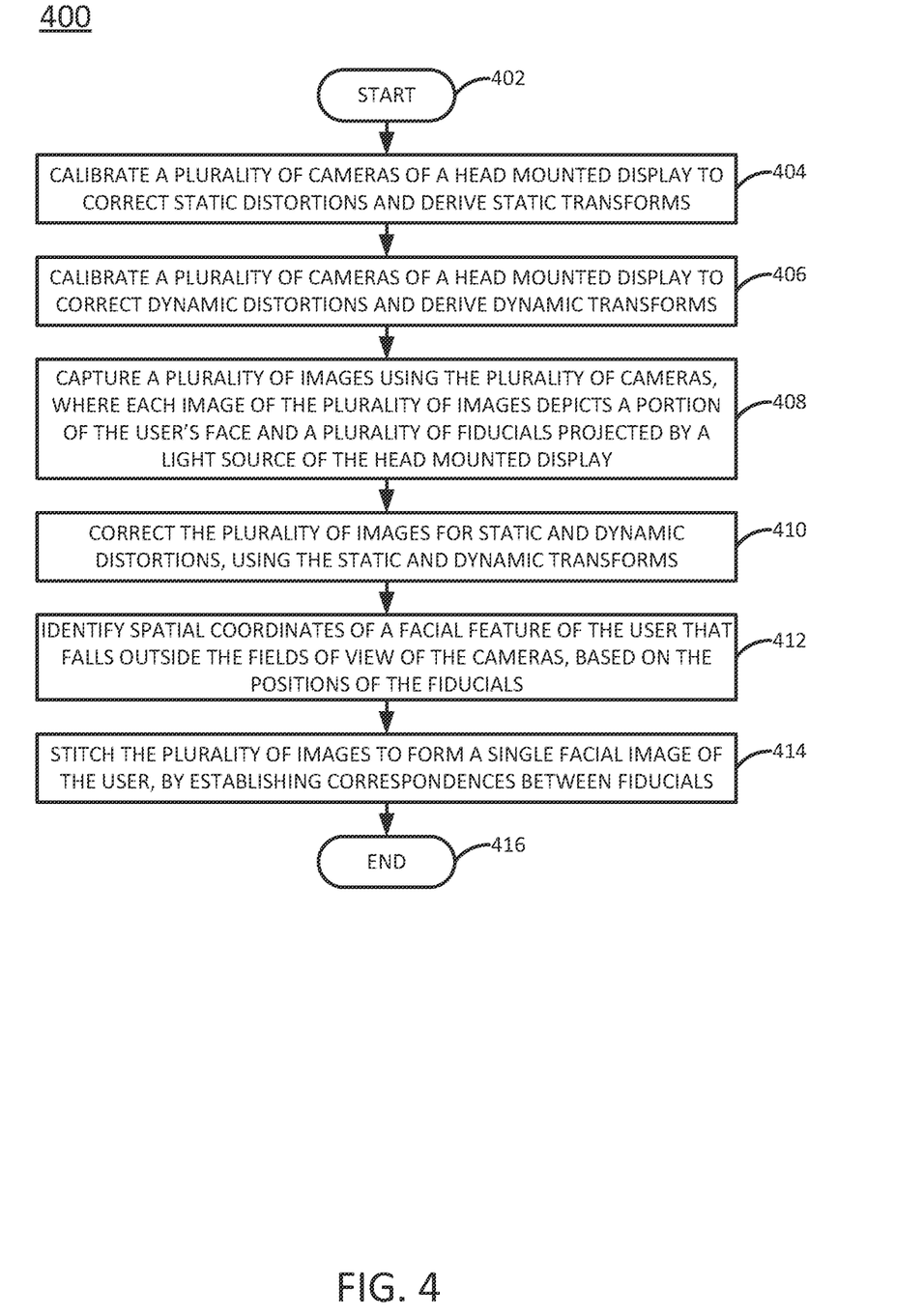
FIG. 4 illustrates a flowchart of an example method for operating a head mounted display.

FIG. 4 illustrates a flowchart of an example method 400 for operating a head mounted display. In particular, the method 400 comprises a more detailed version of the method 200 that includes calibration operations prior to projection of fiducials. The method 400 may be performed, for example, by components of the apparatus 100 illustrated in FIG. 1. As such, reference may be made in the discussion of FIG. 4 to various components of the apparatus 100 to facilitate understanding. However, the method 400 is not limited to implementation with the apparatus illustrated in FIG. 1.

The method 400 begins in block 402. In block 404, a plurality of cameras of a head mounted display (including at least a first camera and a second camera) is calibrated to correct static distortions (e.g., image distortions that may be introduced by the cameras due to hardware differences such as difference in the lenses, assemblies, light sources, and/or the like). As discussed in further detail below, calibration in accordance with block 404 will use a calibration pattern to derive a set of static transforms for each of the cameras (e.g., a first set of static transforms for the first camera and a separate second set of static transforms for the second camera). In one example, block 404 is performed before a user places the HMD on his or her head.

In block 406, the plurality of cameras is are calibrated to correct dynamic distortions (e.g., image distortions that may be introduced by the cameras due to run-time differences such as differences in the user's pose with respect to the cameras, variations in users' facial contours, differences in how the HMD is worn from one session to another, and/or the like). As discussed in further detail below, calibration in accordance with block 406 will use a calibration pattern to derive a set of dynamic transforms for each of the cameras (e.g., a first set of dynamic transforms for the first camera and a separate second set of dynamic transforms for the second camera). In one example, block 406 is performed after a user places the HMD on his or her head.

In block 408, a plurality of images is captured by the plurality of cameras, where the plurality of images includes portions of the user's face, as well as a plurality of fiducials projected by one or more light sources of the HMD. The fiducials may be projected as discussed above in connection with the method 200. Thus, the fiducials are different from the calibration patterns that may be used in blocks 404 and 406.

In block 410, the plurality of images captured in block 408 is corrected for static and dynamic distortions, using the static and dynamic transforms derived in blocks 404 and 406. Thus, the plurality of images may be de-warped and corrected for geometric distortions due to camera to camera variations. Correction of the static and dynamic distortions also results in a spatial separation of the fiducials that are present in the plurality of images.

In block 412, spatial coordinates of a feature of the user's face that falls outside a first field of view of the plurality of cameras is identified, based on the positions of the fiducials in the plurality of images. Thus, block 412 is similar to block 210 of the method 200. Thus, examples of the disclosure may use the fiducials depicted in the images to interpolate between pixels of the images and thereby generate additional images that fill the gaps between the images. The additional images may infer the spatial coordinates of features that were not depicted in the first or second image.

In block 414, the plurality of images may be stitched or aligned, using the plurality of fiducials that has been spatially repositioned in block 410. That is, by establishing a correspondence between a fiducial in a first image and a fiducial in a second image, the first and second images may be aligned. For instance, if the fiducial in the first image is positioned below the center of the user's right eye, and the fiducial in the second image is positioned below the user's left eye, the first and second images may be aligned with each other. As discussed above, any gap between the first and second images may be rectified by interpolating between the pixels of the first and second images and generating an image to fill the gap.

The method 400 ends in block 416. Thus, the end product of the method 400 may be a single facial image of the user, stitched together from a plurality of non-overlapping images (potentially with gaps filled subsequent to the stitching), where each image of the plurality of non-overlapping images depicts a portion of the user's face. The plurality of images may be accurately aligned so that landmark points can be identified with precision.

Figure 5:
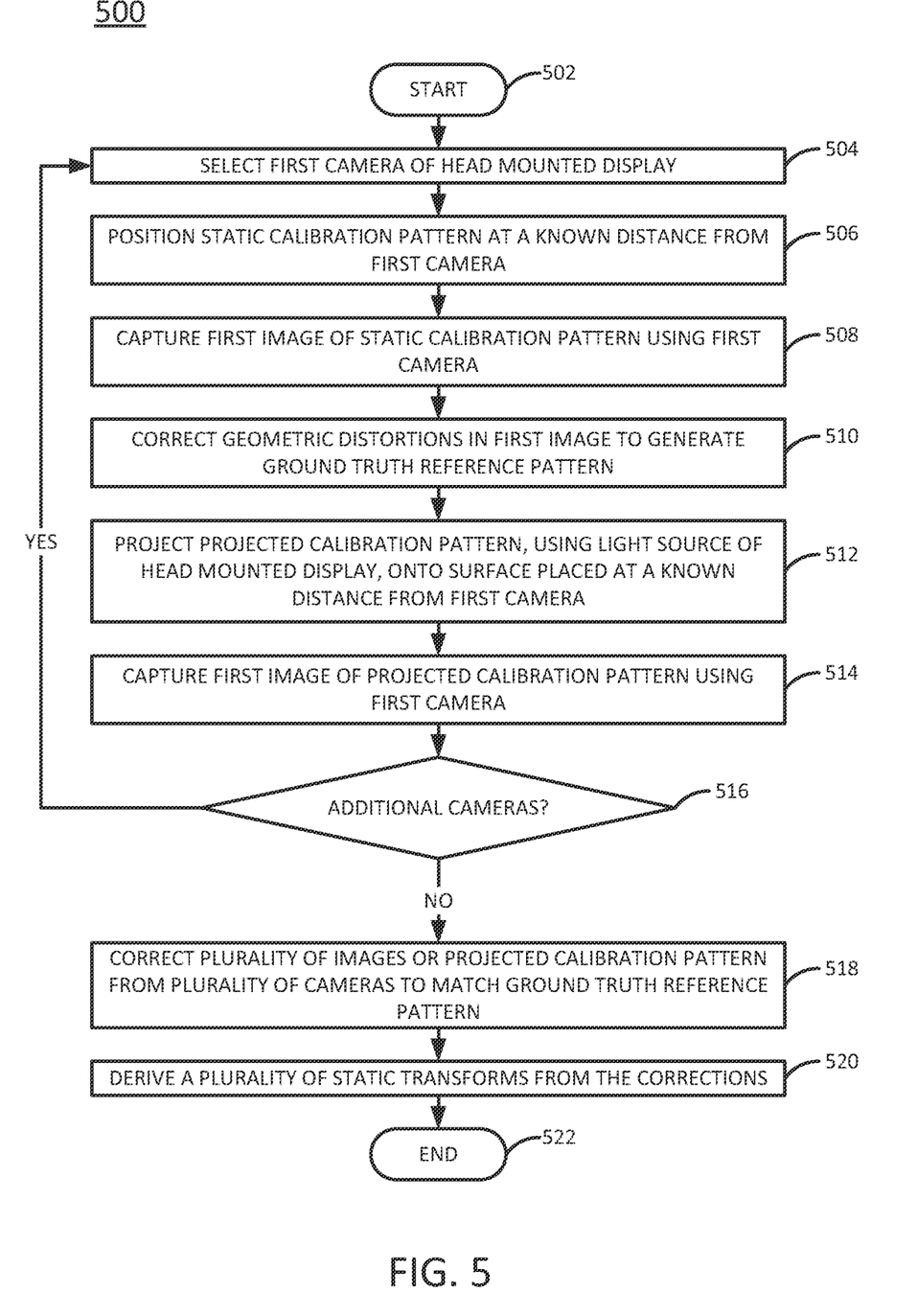
FIG. 5 illustrates a flowchart of an example method for static calibration of the cameras of a head mounted display.

FIG. 5 illustrates a flowchart of an example method 500 for static calibration of the cameras of a head mounted display. The method 500 may be performed, for example, in accordance with block 404 of the method 400.

The method 500 begins in block 502. In block 504, a camera of a head mounted display is selected. The HMD may comprise a plurality of cameras as discussed above. As discussed in further detail below, blocks of the method 500 may be performed for each of the cameras of the HMD. Thus an initial iteration of the block 504 may select a first camera of the plurality of cameras. However, subsequent iterations of the block 504 may select other cameras (e.g., a second camera, a third camera, etc.) of the HMD.

In block 506, a static calibration pattern is positioned at a known distance that approximates the distance from the first camera to a user when the HMD is in use. Thus, block 504 may occur prior to the HMD being put into use (e.g., for a VR application), and may even occur before the first camera is installed on the HMD.

Figure 6:
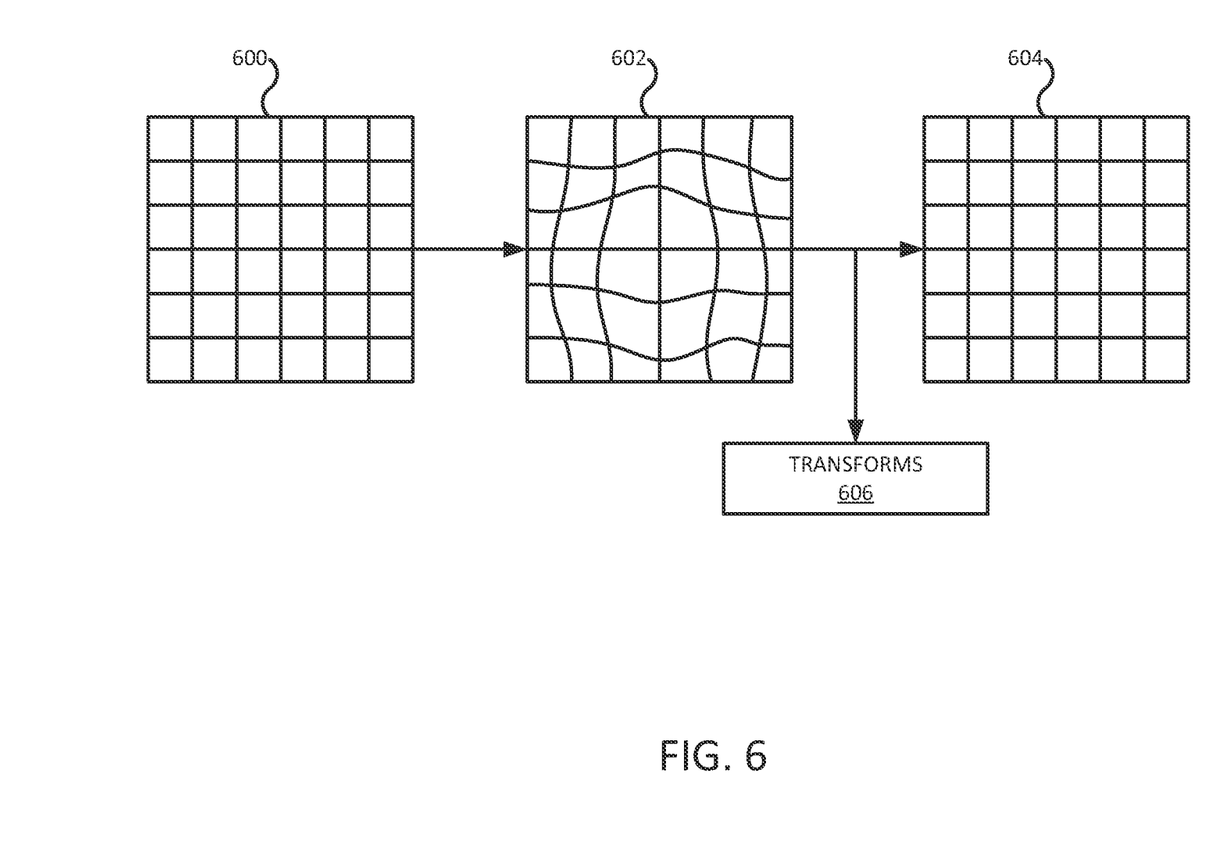
FIG. 6 illustrates an example of a calibration pattern that may be used during execution of the method of FIG. 5.

In one example, the static calibration pattern comprises some well-defined regular pattern, such as a checkerboard, a grid, or a mesh, printed on a substrate (e.g., a tile or sheet or other substrate). FIG. 6, for instance, illustrates an example of a calibration pattern 600 that may be used during execution of the method 500 of FIG. 5. For instance, the calibration pattern 600 of FIG. 6 may be used in accordance with block 506 of the method 500. In the example illustrated, the calibration pattern 600 comprises a grid pattern formed by a plurality of intersecting, rectilinear lines.

In block 508, a first image of the static calibration pattern is captured by the first camera. Due to static distortions that may be unique to the first camera, the first image of the static calibration pattern may depict the static calibration pattern in a geometrically distorted manner. FIG. 6, for instance, illustrates an example image 602 of the static calibration pattern 600 that may be captured by the first camera. As illustrated, the intersecting lines of the grid pattern are not rectilinear in the image 602.

In block 510, geometric distortions in the first image of the static calibration pattern are corrected to generate a ground truth reference pattern. In one example, the ground truth reference pattern is geometrically close to the static calibration pattern. FIG. 6, for instance, illustrates an example ground truth reference pattern 604 corresponding to the calibration pattern 600 and image 602. As illustrated, the intersecting lines of the ground truth reference pattern 604 are, like the lines of the calibration pattern 600, rectilinear.

In block 512, a projected calibration pattern is projected using a first light source of the head mounted display. In one example, the first light source is a light source (e.g., an infrared LED) that is paired with the first camera. Thus, the first camera and first light source may be positioned such that the first camera is able to capture an image of light projected by the first light source.

The projected calibration pattern may be projected onto a flat monochromatic (e.g., gray) surface that is placed at a known distance that approximates the distance from the first camera to a user when the HMD is in use. In one example, the projected calibration pattern is identical (e.g., same geometry and dimensions) to the static calibration pattern used in block 506. Thus, if the static calibration pattern used in block 506 looked like the calibration pattern 600 of FIG.

6, then the projected calibration pattern used in block 512 will also look like the calibration pattern 600.

In block 514, a first image of the projected calibration pattern is captured by the first camera. Due to static distortions that may be unique to the first camera and/or the first light source, the first image of the projected calibration pattern may depict the projected calibration pattern in a geometrically distorted manner, similar to example image 602 of FIG. 6.

In block 516, it is determined whether there are additional cameras in the head mounted display. As discussed above, the HMD may include a plurality of cameras. If there are additional cameras in the HMD, then the method 500 returns to block 504 and selects a next camera of the HMD. Blocks 506-514 are then repeated in the manner described above for the next camera.

If, however, there are no additional cameras in the HMD, then the method 500 proceeds to block 518. By the time the method 500 reaches block 518, it will have access to a plurality of images. This plurality of images includes at least the first image of the projected calibration pattern captured by the first camera of the HMD (captured as described above in a first iteration of blocks 506-514), and a second image of the projected calibration pattern captured by a second camera of the HMD (captured as described above in a second iteration of blocks 506-514), where the second camera is different from the first camera. The first and second images of the projected calibration pattern are functions of the respective camera distortions, relative rotational and translational differences between the respective cameras and corresponding light sources, and relative sale differences due to variations in the fields of view of the respective cameras.

In block 518, the plurality of images is corrected to match the ground truth reference pattern (e.g., ground truth reference pattern 604), and thus to match each other. Correcting an image in accordance with block 518 involves removing geometric distortions, correcting rotations, and/or scaling the image until the image matches the ground truth reference pattern.

In block 520, a plurality of static transforms is derived from the correction of the plurality of images in block 518. The static transforms comprise the mathematical operations that were performed on the plurality of images to produce the ground truth reference pattern. For instance, referring again to FIG. 6, a set of static transforms 606 may be derived when correcting an image of a projected reference pattern that looks like the image 602 to match the ground truth reference pattern 604. The set of static transforms associated with each image is stored for the camera that captured the image and used later, e.g., in accordance with block 410 of the method 400.

The method 500 ends in block 522.

Figure 7:
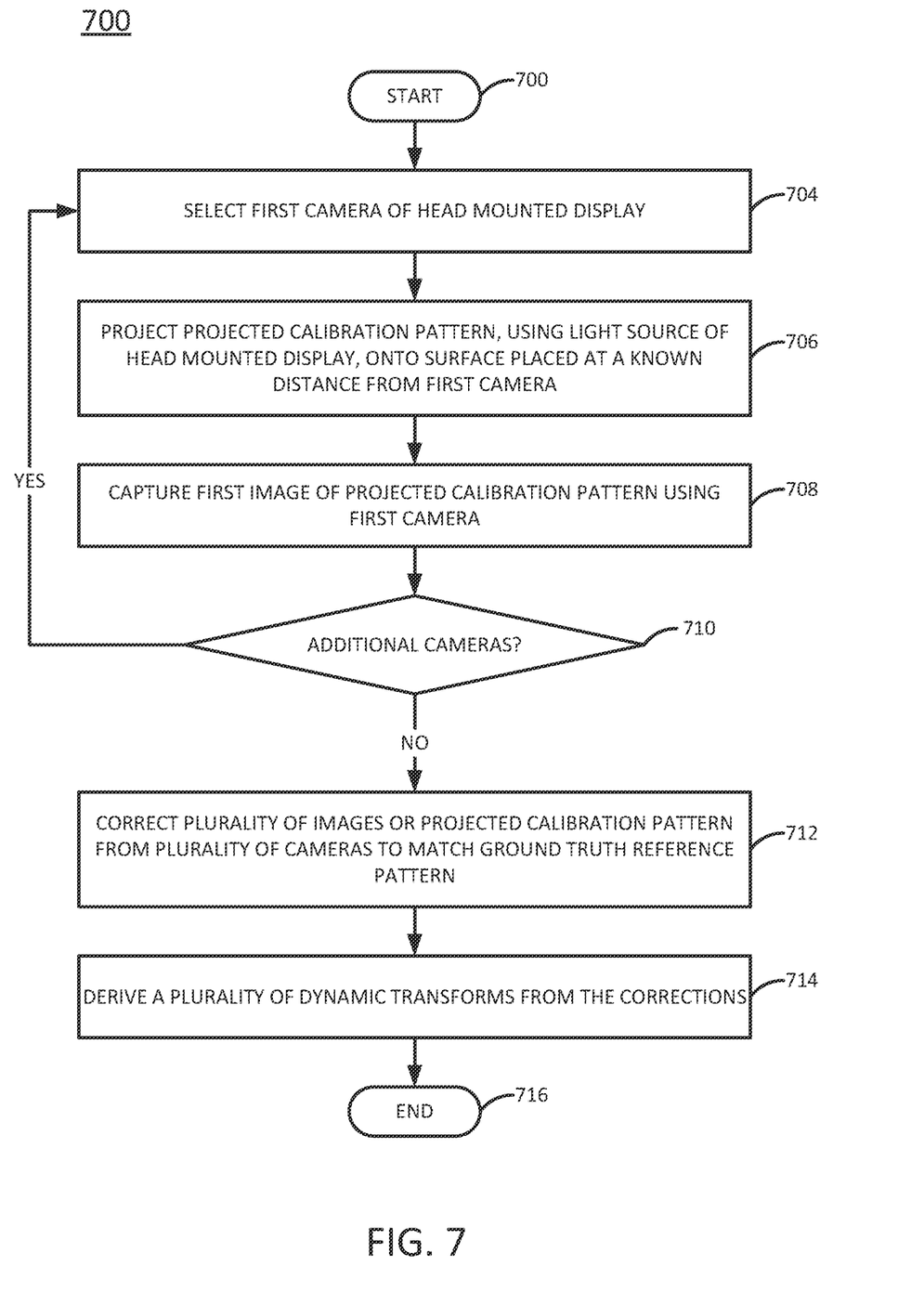
FIG. 7 illustrates a flowchart of an example method for dynamic calibration of the cameras of a head mounted display.

FIG. 7 illustrates a flowchart of an example method 700 for dynamic calibration of the cameras of a head mounted display. The method 700 may be performed, for example, in accordance with block 406 of the method 400.

The method 700 begins in block 702. In block 704, a camera of a head mounted display is selected. The HMD may comprise a plurality of cameras as discussed above. As discussed in further detail below, blocks of the method 700 may be performed for each of the cameras of the HMD. Thus an initial iteration of the block 704 may select a first camera of the plurality of cameras. However, subsequent iterations of the block 704 may select other cameras (e.g., a second camera, a third camera, etc.) of the HMD.

In block 706, a projected calibration pattern is projected onto a portion of a user's face using a first light source of the head mounted display. In one example, the first light source is a light source (e.g., an infrared LED) that is paired with a first camera of the HMD. Thus, the first camera and first light source may be positioned such that the first camera is able to capture an image of light projected by the first light source.

In one example, the projected calibration pattern is identical (e.g., same geometry and dimensions) to the static and projected calibration pattern used to correct static distortions (e.g., according to the method 600). Thus, the projected calibration pattern used in block 706 may look like the calibration pattern 600 of FIG. 6.

In block 708, a first image of the projected calibration pattern is captured by the first camera. Due to static and/or dynamic distortions that may be unique to the first camera and/or the first light source, the first image of the projected calibration pattern may depict the projected calibration pattern in a geometrically distorted manner, similar to example image 602 of FIG. 6.

In block 710, it is determined whether there are additional cameras in the head mounted display. As discussed above, the HMD may include a plurality of cameras. If there are additional cameras in the HMD, then the method 700 returns to block 704 and selects a next camera of the HMD. Blocks 706-708 are then repeated in the manner described above for the next camera.

If, however, there are no additional cameras in the HMD, then the method 700 proceeds to block 712. By the time the method 700 reaches block 712, it will have access to a plurality of images. This plurality of images includes at least the first image of the projected calibration pattern captured by the first camera of the HMD (captured as described above in a first iteration of blocks 706-708), and a second image of the projected calibration pattern captured by a second camera of the HMD (captured as described above in a second iteration of blocks 706-708), where the second camera is different from the first camera.

In block 712, the plurality of images is corrected to match the ground truth reference pattern (e.g., ground truth reference pattern 604 of FIG. 6), using sets of static transforms associated with the corresponding cameras. The sets of static transforms may be derived in accordance with a process such as that described in connection with FIG. 5. Correcting an image in accordance with block 712 involves removing geometric distortions, correcting rotations, and/or scaling the image until the image matches the ground truth reference pattern.

In block 714, a plurality of dynamic transforms is derived from the correction of the plurality of images in block 712. The dynamic transforms comprise the mathematical operations that were performed on the plurality of images to produce the ground truth reference pattern. The set of dynamic transforms associated with each image is stored for the camera that captured the image and used later, e.g., in accordance with block 410 of the method 400.

The method 700 ends in block 716.

In some examples, the light source associated with each camera of the HMD can be used to create a depth map that helps to correct distortions due to differences in depth perception. The distortion of landmark points in images may vary with depth differentials. Such distortion is generally negligible in systems where there is a large distance between the camera and the user. However, for an HMD in which the distance between a camera and the user may be a few centimeters (e.g., 2-3 centimeters), such distortions can be magnified. Thus, examples of the disclosure may segment captured images based on depth maps that are created using the light sources. Each segment in this case may utilize the same transform(s) for all pixels in the segment when performing post-processing of the images.

It should be noted that although not explicitly specified, some of the blocks, functions, or operations of the methods 200, 400, 500, and 700 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIGS. 2, 4, 5, and 7 that recite a determining operation, or involve a decision, do not necessarily imply that both branches of the determining operation are practiced.

Figure 8:
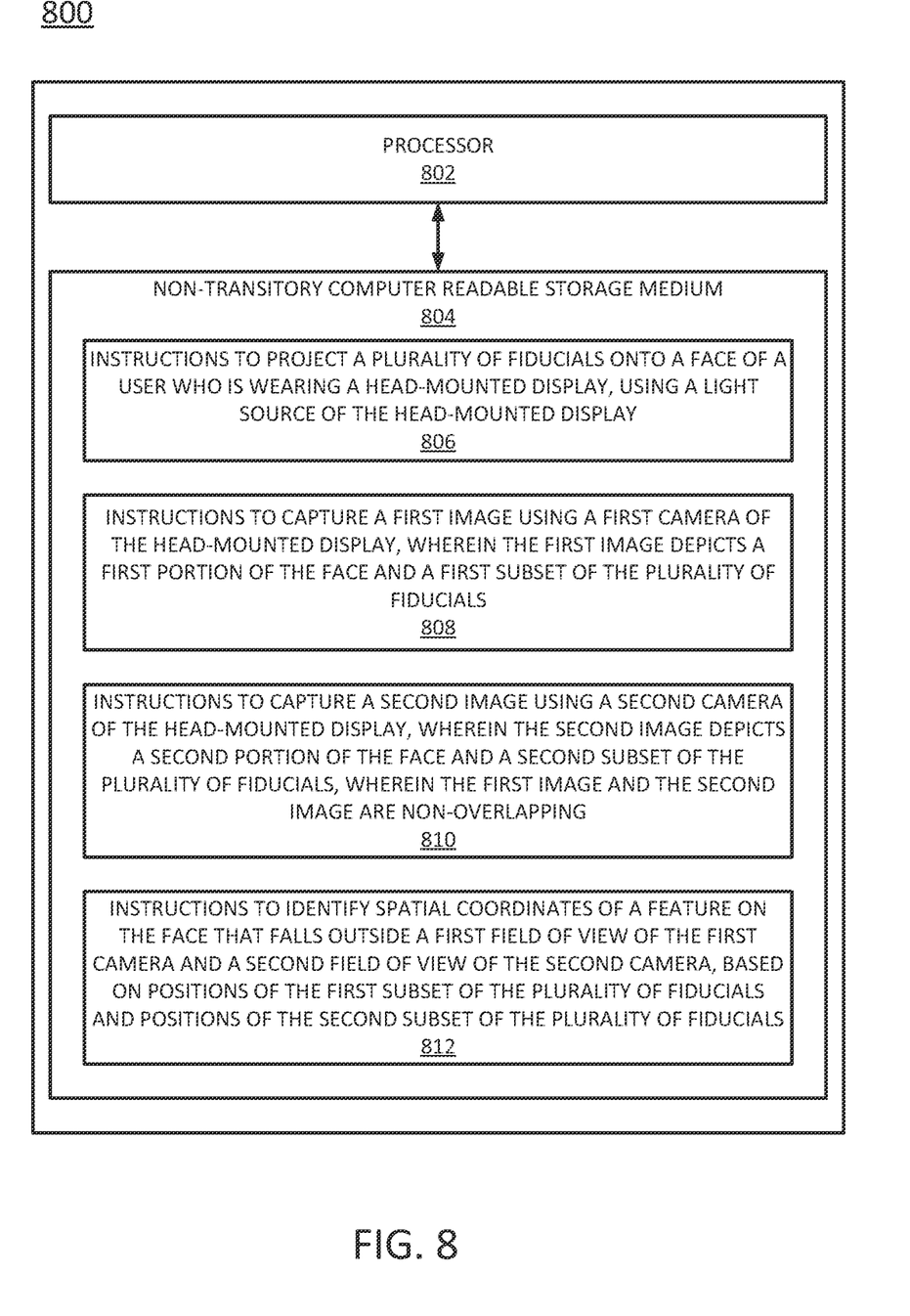
FIG. 8 illustrates an example of an apparatus.

FIG. 8 illustrates an example of an apparatus 800. In one example, the apparatus 800 may be the apparatus 100. In one example, the apparatus 800 may include a processor 802 and a non-transitory computer readable storage medium 804. The non-transitory computer readable storage medium 604 may include instructions 806, 808, 810, and 812 that, when executed by the processor 802, cause the processor 802 to perform various functions.

The instructions 806 may include instructions to project a plurality of fiducials onto a face of a user who is wearing a head-mounted display, using a light source of the head-mounted display. The instructions 808 may include instructions to capture a first image using a first camera of the head-mounted display, wherein the first image depicts a first portion of the face and a first subset of the plurality of fiducials. The instructions 810 may include instructions to capture a second image using a second camera of the head-mounted display, wherein the second image depicts a second portion of the face and a second subset of the plurality of fiducials, wherein the first image and the second image are non-overlapping. The instructions 812 may include instructions to identify spatial coordinates of a feature on the face that falls outside a first field of view of the first camera and a second field of view of the second camera, based on positions of the first subset of the plurality of fiducials and positions of the second subset of the plurality of fiducials.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
  a support configured to be worn on a head of a user;
  a first camera mounted on the support and positioned to capture a first image of a face of the user, wherein the first image depicts a first subset of a plurality of fiducials that is projected onto the face of the user;
  a second camera mounted on the support and positioned to capture a second image of the face of the user, wherein the second image depicts a second subset of the plurality of fiducials projected onto the face of the user; and
  a processor mounted to the support and programmed to stitch the first image of the face of the user and the second image of the face of the user together to construct a single image of the face based on positions of the first subset of the plurality of fiducials and positions of the second subset of the plurality of fiducials, wherein no fiducials of the first subset of the plurality of fiducials are depicted in the second image of the face of the user, and no fiducials of the second subset of the plurality of fiducials are depicted in the first image of the face of the user.

2. The apparatus of claim 1, wherein the first camera and the second camera are mounted on an inward-facing side of the support.

3. The apparatus of claim 1, further comprising:
  a light source mounted to the support to project the plurality of fiducials.

4. A method, comprising:
  projecting a plurality of fiducials onto a face of a user who is using a display, using a light source of the display;
  capturing a first image using a first camera of the display, wherein the first image depicts a first subset of the plurality of fiducials;
  capturing a second image using a second camera of the display, wherein the second image depicts a second subset of the plurality of fiducials; and
  stitching the first image and the second image together to construct a single image of the face based on positions of the first subset of the plurality of fiducials and positions of the second subset of the plurality of fiducials, wherein no fiducials of the first subset of the plurality of fiducials are depicted in the second image of the face of the user, and no fiducials of the second subset of the plurality of fiducials are depicted in the first image of the face of the user.

5. The method of claim 4, wherein a geometric separation between the first camera and the second camera is known prior to the projecting.

6. The method of claim 4, further comprising:
  interpolating between pixels of the first image and pixels of the second image; and
  generating a third image to fill a gap between the first image and the second image, based on the interpolating.

7. The method of claim 6, wherein the gap includes a feature of the face of the user that is not depicted in the first image and not depicted in the second image.

8. The method of claim 4, further comprising:
  prior to the projecting, calibrating the first camera and the second camera to correct for static distortions.

9. The method of claim 8, wherein the calibrating comprises:
  deriving a first set of static transforms for the first camera and a second set of static transforms for the second camera.

10. The method of claim 9, wherein the deriving comprises:
  projecting a known pattern onto a surface, using the light source of the display;
  capturing a first image of the known pattern on the surface, using the first camera;
  capturing a second image of the known pattern on the surface, using the second camera;
  correcting geometric distortions in the first image based on knowledge of the known pattern, wherein corrections to the geometric distortions in the first image become the first set of static transforms; and
  correcting geometric distortions in the second image based on knowledge of the known pattern, wherein corrections to the geometric distortions in the second image become the second set of static transforms.

11. The method of claim 8, further comprising:
subsequent to the calibrating to correct for static distortions and prior to the projecting, calibrating the first camera and the second camera to correct for dynamic distortions.

12. The method of claim 11, wherein the calibrating comprises:
deriving a first set of dynamic transforms for the first camera and a second set of dynamic transforms for the second camera.

13. The method of claim 12, wherein the deriving comprises:
projecting a known pattern onto a surface, using the light source of the display;
capturing a first image of the known pattern on the surface, using the first camera;
capturing a second image of the known pattern on the surface, using the second camera;
correcting geometric distortions in the first image based on knowledge of the known pattern, wherein corrections to the geometric distortions in the first image become the first set of dynamic transforms; and
correcting geometric distortions in the second image based on knowledge of the known pattern, wherein corrections to the geometric distortions in the second image become the second set of dynamic transforms.

14. A non-transitory machine-readable storage medium encoded with instructions executable by a processor, the machine-readable storage medium comprising:
instructions to project a plurality of fiducials onto a face of a user who is using a display, using a light source of the display;
instructions to capture a first image using a first camera of the display, wherein the first image depicts a first subset of the plurality of fiducials;
instructions to capture a second image using a second camera of the display, wherein the second image depicts a second subset of the plurality of fiducials; and
instructions to stitch the first image and the second image together to construct a single image of the face based on positions of the first subset of the plurality of fiducials and positions of the second subset of the plurality of fiducials, wherein no fiducials of the first subset of the plurality of fiducials are depicted in the second image of the face of the user, and no fiducials of the second subset of the plurality of fiducials are depicted in the first image of the face of the user.

15. The non-transitory machine-readable storage medium of claim 14, further comprising:
instructions to interpolate between pixels of the first image and pixels of the second image; and
instructions to generate a third image to fill a gap between the first image and the second image, based on the interpolating.

16. The non-transitory machine-readable storage medium of claim 15, wherein the gap includes a feature of the face of the user that is not depicted in the first image and not depicted in the second image.

17. The non-transitory machine-readable storage medium of claim 14, wherein a geometric separation between the first camera and the second camera is known prior to the plurality of fiducials being projected.

18. The non-transitory machine-readable storage medium of claim 14, further comprising:
instructions to calibrate the first camera and the second camera to correct for static distortions prior to the plurality of fiducials being projected.

19. The non-transitory machine-readable storage medium of claim 14, further comprising:
instructions to calibrate the first camera and the second camera to correct for dynamic distortions, subsequent to the first camera and the second camera being calibrated to correct for static distortions and prior to the plurality of fiducials being projected.

20. The non-transitory machine-readable storage medium of claim 14, wherein the display is worn on a head of the user.

* * * * *